United States Patent [19]

Busby

[11] 4,245,270
[45] Jan. 13, 1981

[54] CIRCUIT CARD WITH SOFT POWER SWITCH

[75] Inventor: W. Ray Busby, Richardson, Tex.

[73] Assignee: Rockwell International Corporation, El Segundo, Calif.

[21] Appl. No.: 972,753

[22] Filed: Dec. 26, 1978

[51] Int. Cl.³ .............................................. H02H 7/20
[52] U.S. Cl. ......................................... 361/58; 361/9; 361/111
[58] Field of Search .................... 361/58, 111, 110, 8, 361/9, 13, 395, 397, 404, 413, 424, 409, 414; 307/200 A, 203

[56] References Cited
U.S. PATENT DOCUMENTS

| | | | |
|---|---|---|---|
| 3,935,511 | 1/1976 | Boulanger et al. | 361/111 X |
| 3,935,527 | 1/1976 | Michelet et al. | 361/111 X |
| 3,993,935 | 11/1976 | Phillips et al. | 361/413 X |
| 4,079,440 | 3/1978 | Ohnuma et al. | 361/413 X |

*Primary Examiner*—Patrick R. Salce
*Attorney, Agent, or Firm*—V. Lawrence Sewell; Howard R. Greenberg; H. Fredrick Hamann

[57] ABSTRACT

A circuit card is disclosed of the type for connection to a system by means of connector pins on the card. The circuit card includes a soft power switch for reducing the power transient effects of inserting the card by gradually coupling the circuit load on the card to the system power supply voltage. Connector pins of various extensions are used to initiate events in the coupling of the circuit load to the power supply voltage. The card further includes logic which causes the circuit load to be gradually decoupled from the power supply upon removal of the card from the system.

16 Claims, 1 Drawing Figure

CIRCUIT CARD WITH SOFT POWER SWITCH

BACKGROUND OF THE INVENTION

This invention relates to a circuit card of the type for insertion to connect a circuit on the card to a system, by means of connector pins. In particular, the invention relates to a circuit card including apparatus for reducing power transients upon insertion or removal of the card.

In circuit cards of the type which are inserted to connect to a system with connector pins, power transients are a persistent problem. The circuit which is on the card causes a sudden change in the load on the system power supply when the card is inserted. This has at least two effects. First, the circuit on the card is subjected to the sudden application of power. Second, a transient is generated in the power supply voltage of the system, which can affect other circuits powered by the same voltage.

A part of this problem is conventionally dealt with by generating a "power on clear" signal. This can be done, for example, by disabling signal outputs from the circuit card for a time sufficient to allow the power transient to die out, thereby eliminating the generation of false outputs. This is indeed only a partial solution, particularly failing to provide any protection from the power transient for other circuits in the system into which the card is inserted.

It is therefore an object of the invention to reduce the effect on a system power supply voltage of inserting a circuit card into the system.

It is also an object of the invention to reduce the power transient effects on a circuit card of inserting the card into a system.

It is a further object of the invention to reduce the effect on a system power supply voltage of removing a circuit card from the system.

SUMMARY OF THE INVENTION

In accordance with the present invention, there is provided a circuit card which includes apparatus for gradually coupling the circuit load of the card to the system power supply voltage upon insertion of the card.

In a preferred embodiment, there is also included apparatus for gradually decoupling the load from the system power supply voltage upon removal of the card.

Additionally, in a preferred embodiment, the circuit card includes means for directly connecting the load to the power supply voltage after the gradual coupling is completed, and turning off the apparatus which gradually couples the load.

In the operation of the circuit card of the invention, power transients are drastically reduced, because power is gradually applied to the circuit card load, rather than being suddenly connected. This provides protection from the transients not only on the card itself, but throughout the system. When the gradual application of the power to the circuit card load is complete, the apparatus for gradually applying the power is bypassed, directly connecting the load with the power supply. In addition, the apparatus for gradually applying power to the load is turned off so that it will not add to the power consumption of the circuit card. When the card is to be removed, the circuit load is gradually decoupled from the power supply, reducing the power transient at this time, as well.

DESCRIPTION OF THE PREFERRED EMBODIMENT

Figure 1:
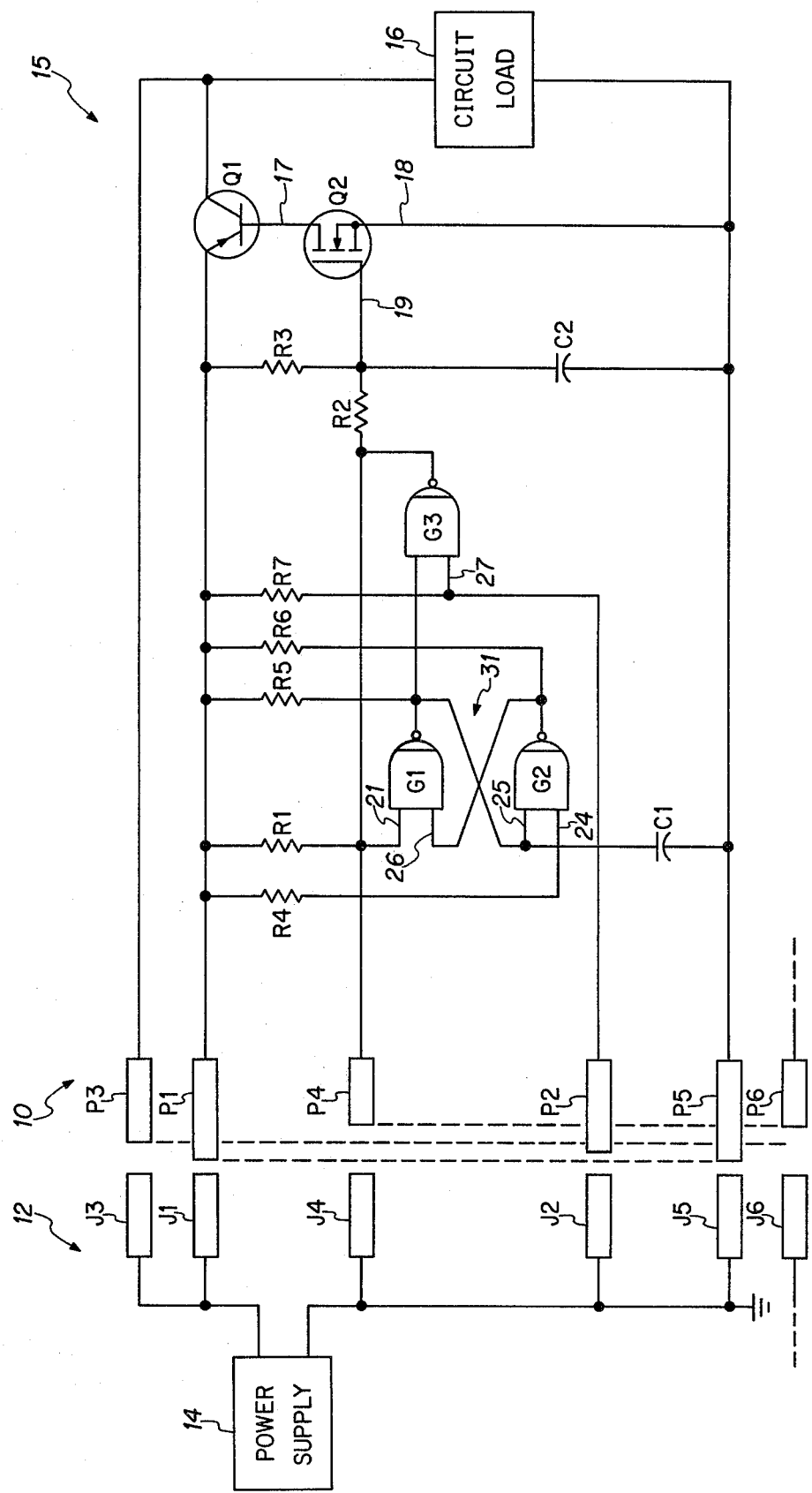
FIG. 1 is a schematic diagram of a circuit card according to the invention.

FIG. 1 shows elements of a circuit card according to the invention, indicated generally by the reference numeral 10. Connector pins P1-P6 are for insertion in receptacles J1-J6 of a system, indicted generally by the reference numeral 12. The system 12 can contain a number of elements, including a number of circuit cards like card 10. Typically, each card makes many pin connections with the system, including, for example, signal inputs to be processed by the card, outputs from the card, supply voltages and a reference or ground voltage. In FIG. 1, the many possible signal connections are represented simply by receptacle J6 and pin P6. Connections to a voltage of system power supply 14 are made at receptacles J1 and J3. Receptacles J2, J4 and J5 supply ground connections.

It will be apparent to one skilled in the art that any one of the pin-receptacle pairs shown can be physically embodied by multiple pin-receptacle pairs to obtain enhanced reliability and current capacity.

Physically, pins P1-P6 can be similar to pins in an ordinary edge-on connector, in that they are plated on the circuit card substrate or base, as are other printed circuit conductors. Pins P1-P6 are somewhat unusual in that they extend varying amounts toward their corresponding receptacles, so that the pins engage the receptacles at different times. This can be accomplished simply by printing the pins with different extensions. As illustrated in the drawing, pins P1 and P5 extend the most, to make connection with receptacles J1 and J5, respectively, before the other pins do. Then pins P2, P3 and P4 connect to system 12, in sequence. The signal pins represented by P6 connect along with pin P4. Upon removal of the circuit card, all these pins disconnect in the reverse order of their connection.

The circuit load 16, that is, the main circuit on the circuit card, is connected between pins P3 and P5. It is also connected in series with a transistor Q1 between pins P1 and P5. Transistor Q1, gates G1 and G3, pin P1-P5, and other elements to be described form a soft power switch, designated by numeral 15. Switch 15 acts to gradually couple circuit load 16 to the voltage of power supply 14 in a period before the load is directly connected to the power supply voltage.

The emitter of transistor Q1 is connected to pin P1 and the collector to the circuit load 16. The base of transistor Q1 is driven by the drain 17 of a VMOS transistor Q2 which has the source 18 thereof connected to pin P5. The gate 19 of the transistor Q2 is controlled by a voltage across a capacitor C2, which is connected in series with a resistor R3 between pins P1 and P5. Also connected to the capacitance C2 is a resistor R2 which has the other terminal thereof connected to pin P4.

Pin P4 is additionally connected to both an input and an output of a network of open collector NAND gates G1-G3. When the output of one of gates G1-G3 is a logical "0", its voltage is low, near ground. When the output is "1", the voltage at the output terminal is determined by the external circuitry connected to it, ordinarily being high. Gates G1 and G2 are interconnected as a flip-flop, indicated by numeral 31, with pin P4 as a latching input to gate G1. The output of flip-flop 31 is one input to gate G3, which has pin P2 as the other input. Resistors R1 and R4–R7 provide pull-up functions for terminals 21 and 24–27 of gates G1–G3. Connected between input terminal 25 of gate G2 and pin P5 is capacitor C1. In an alternate configuration, resistor R4 can be deleted by connecting input terminal 24 of gate G2 to the other terminal 25 thereof, letting resistor R5 pull up both the terminals 24 and 25.

The following tabulation includes suitable values and types for the components shown in FIG. 1. These components would be appropriate for use with a system power supply voltage of +5 v.

| | |
|---|---|
| Q1 | 2N5683 |
| Q2 | 2N6659 |
| R1 | 4.7 kΩ |
| R2 | 4.7 kΩ |
| R3 | 47 kΩ |
| R4 | 22 kΩ |
| R5 | 22 kΩ |
| R6 | 22 kΩ |
| R7 | 22 kΩ |
| C1 | 1 μF |
| C2 | 1μF |
| G1–G3 | 74LS03 |

On insertion of the circuit card 10, capacitor C2 initially has no charge. When pins P1 and P5 make connection with receptacles J1 and J5, respectively, the voltage of power supply 14 begins to charge capacitor C2 through resistor R3 and through the series combination of resistors R1 and R2.

Capacitor C1 had zero charge initially, so that input terminal 25 of gate G2 is low, and the gate remains off. Pull-up resistor R6 holds the output of gate G2 high (a logical 1); this output is connected to input terminal 26 of gate G1. Resistors R1 and R2 are selected to present a logical 1 to input terminal 21 of gate G1 also so that the output of gate G1 is low. This output applied to gate G3 holds its output off.

As capacitor C2 charges, it applies an increasing voltage to the gate 19 of transistor Q2. Transistor Q2 converts this voltage, with negligible loading, to a corresponding current drive at the base of transistor Q1. As a result, the voltage of power supply 14 at pin P1 is increasingly coupled to circuit load 16 through transistor Q1.

As the circuit card 10 is inserted further, pin P2 makes connection with receptacle J2, grounding input terminal 27 of gate G3. This does not affect the state of gate G3, which was off.

As the circuit card 10 is inserted further still, pin P3 connects with receptacle J3, directly connecting the voltage of power supply 14 to circuit load 16. The collector voltage of transistor Q1 just before pin P3 connects should be as near the power supply voltage as possible. Therefore, it is preferable for transistor Q1 to be switched substantially completely on by the time pin P3 connects. The time elapsed between the connections of pin P1 and pin P3 is determined by the difference in the extensions of the two pins and the speed at which the circuit card is inserted. The time required to turn transistor Q1 completely on is largely determined by the time constant selected for the resistance-capacitance circuit which includes resistors R1, R2 and R3 along with capacitor C2. It is also preferable that transistor Q1 have a low saturation voltage, so that the change in voltage at the collector of the transistor upon the connection of pin P3 be as small as possible. This will minimize any transient generated at that time.

When pin P4 connects, it grounds the end of resistor R2 to which it is connected. Resistor R2 is chosen much smaller than resistor R3 so that only a small part of the power supply voltage is across resistor R2. As a result, capacitor C2 begins discharging, upon the connection of pin P4, toward this small fraction of the power supply voltage. As capacitor C2 discharges, decreasing the voltage at the gate of transistor Q2, transistors Q2 and Q1 are turned off.

The connection of pin P4 has another effect as well. Grounding input terminal 21 of gate G1 turns off that gate, allowing the output to go high. Capacitor C1 therefore begins charging, and as input terminal 25 of gate G2 goes high, its output goes low, latching the G1/G2 flip-flop 31. Gate G3 does not change state, because input terminal 27 is held low by the grounded pin P2. The reason for switching the flip-flop 31 is so that when pin P2 disconnects during removal of the card, gate G3 will switch state.

During inserted operation of the circuit card, the circuit load 16 is directly connected to pin P3, and both transistors Q1 and Q2 are off. The flip-flop remains set with the gate G1 output high. Power consumed by the soft power switch 15 during normal operation of the circuit card will ordinarily be negligible compared to that used by circuit load 16.

When removal of circuit card 10 is begun, the first pin to disconnect is pin P4. Since gate G3 is still off, the voltage at pin P4 is no longer held down after pin P4 disconnects. Capacitor C2 therefore begins to charge through resistors R1–R3, turning on transistors Q2 and Q1.

When pin P3 disconnects, the direct connection of circuit load 16 to the voltage of power supply 14 is broken. Therefore, it is important that transistor Q1 be completely turned on, coupling circuit load 16 to the power supply voltage as fully as possible, at the time that pin P3 disconnects. Thus, the difference in the extension of pin P4 with respect to that of pin P3 must produce a difference in disconnect times which accords with the time constant of the charging network that includes resistors R1–R3 and capacitor C2. It is to be expected that even when transistor Q1 is fully turned on, there will be a small difference between the voltage at the collector of transistor Q1 before and after pin P3 disconnects. A very small power supply transient would be experienced by the circuit load 16 in this case.

When pin P2 disconnects, input terminal 27 of gate G3 goes high and, along with the output of gate G1, causes the output of gate G3 to go low. This once again pulls down the end of resistor R2 which is connected to pin P4 and thereby discharges capacitor C2. As a result, transistor Q2 and transistor Q1 are gradually turned off and the circuit load 16 is progressively decoupled from the voltage of power supply 14. It should be noted that this is just opposite of the response observed during card insertion in the period between the connection of pin P1 and pin P2. In that period, capacitor C2 was charging. The difference is produced by logic gates G1–G3, with flip-flop 31 becoming latched during card insertion, then gate G3 switches when pin P2 disconnects.

Preferably, pin P2 should not disconnect before pin P3 does. To do so would cause transistor Q1 to begin turning off before the direct connection of the power supply voltage to the circuit load 16 was disconnected by pin P3. This would accentuate the difference in the voltage seen by the circuit load 16 before and after the disconnection of pin P3. Under ideal circumstances of insertion and withdrawal, it should be satisfactory for pin P2 to have the same extension as pin P3. It is preferable in a practical embodiment, however, for pin P2 to have a slightly greater extension so as to ordinarily disconnect somewhat after pin P3 and never before.

When pins P1 and P5 disconnect, the circuit card 10 is totally disconnected from the system 12. Preferably, transistor Q1 will be substantially completely off by the time pins P1 and P5 disconnect, so that no small power transients are generated. The difference in disconnect times between pin P1 and pin P2 is controlled in the design by the difference between the extensions of these pins. The time over which transistor Q1 turns off is adjusted by the time constant of the network which includes capacitor C2 and resistors R2 and R3.

To recapitulate the operation of the soft power switch 15, pins P1 and P5 connect first during insertion, to the power system power supply voltage and to ground, respectively. The charging of capacitor C2 progressively turns on transistor Q2 and thereby transistor Q1. When circuit load 16 has become substantially coupled to the power supply voltage through transistor Q1, pin P3 connects, bypassing transistor Q1 and connecting the power supply voltage directly to the circuit load 16. Then pin P4 connects, turning off transistor Q2 and the bypassed transistor Q1 in order to save on power.

Upon removal of the circuit card, pin P4 disconnects first, allowing capacitor C2 to charge, turning on transistors Q2 and Q1. Thereafter, pin P3 disconnects, removing the direct connection of the power supply voltage to the circuit load 16. At this point, the circuit load is coupled to the power supply voltage through the turned on transistor Q1. Subsequently, when pin P2 disconnects, the state of logic gates G1–G3 is such that capacitor C2 begins to discharge, gradually turning off transistor Q1 and decoupling the circuit load from the system power supply.

As described above, there may be exceedingly small transients created by differences in the voltage at the collector of transistor Q1 before and after the connection (and disconnection) of pin P3. In addition, the soft power switch 15 itself does connect abruptly to the voltage of power supply 14 upon the connection of pin P1 and P5. The smaller number of components in the soft power switch 15 minimizes the effect of this loading. The initial current draw is largely made up of the demands of logic gates G1–G3, along with the current through resistor R5 and the current charging capacitor C2 through resistors R1–R3.

Because of the operation of pin P4 in turning off transistors Q1 and Q2, the soft power switch 15 consumes little power itself during normal operation of the inserted circuit card 10. The power drain during this period is largely limited to that required for gates G1–G3.

As can be understood from considering the operation of the soft power switch 15, it virtually eliminates the effects of power transients upon circuit card insertion and removal. Rather than the abrupt connection and disconnection of circuit load 16 to the voltage of the power supply 14, the load is gradually coupled and decoupled to the power supply voltage according to a time constant adjusted through capacitance C2 and resistors R1–R3. As a result, circuit load 16 is spared the effects of power transients accompanying the conventional abrupt connection and disconnection. More importantly, system 12 and the circuits associated therewith are likewise secured against these effects.

In addition to the protection offered by the soft power switch 15, it may be considered desirable to provide a power on clear signal to enable the output of signal processing circuitry included in load 16, once there is a complete power transfer to the load 16. The output of gate G1 can conveniently serve as such a power on clear signal.

It may be desirable in a particular circuit application to leave power switch 15 turned on, even after the circuit card 10 is fully inserted. This can be accomplished, for example, by modifying the switch 15 so that pin P4 and input terminal 21 of gate G1 are connected to each other, but not to the point between resistors R1 and R2. In addition, a pull-up resistor should be provided to connect from terminal 21 to pin P1. In such a configuration, the connection of pin P4 to receptacle J4 sets the flip-flop 31 but does not discharge capacitor C2. As a result, transistors Q2 and Q1 remain on so long as the circuit card 10 is inserted in the system 12.

Leaving the soft power switch 15 on during normal operation of the circuit load 16 is useful when combined with a form of interlocking function utilizing gate G3 and/or additional circuitry. For example, it may be important to ensure that power is not applied to the circuit load, unless some particular condition is met. To impose such a constraint, the soft power switch 15 is modified as described so as to remain on as long as the circuit card is inserted. In addition, the connection between pin P3 and the collector of transistor Q1 is deleted, so that the transistor Q1 is the only link coupling the circuit load to the power supply. In addition, gate G3 is provided with another input, responsive to the particular condition. Then, so long as the particular condition is met, gate G3 is enabled to operate normally, causing transistor Q1 to gradually couple the circuit load to the power supply and maintain the coupling so long as the circuit card is inserted. If the particular condition is not met, transistor Q1 is prevented for ever turning on.

Although preferred embodiments of the invention have been described in detail, it is to be understood that various changes, substitutions and alterations can be made therein without departing from the spirit and scope of the invention as defined by the appended claims.

I claim:

1. In a circuit card of the type having a plurality of connector pins for electrically connecting to a system upon insertion of the card and disconnecting from the system upon removal of the card, and wherein the system includes a power supply voltage, and the circuit card includes an electrical circuit comprising a load for connection to the power supply voltage, the improvement comprising means interposed between said load and the system power supply voltage for gradually coupling said circuit load to the power supply voltage upon insertion of the card, said means for gradually coupling, including means for coupling between an input terminal thereof and an output terminal thereof, to an extent which is substantially continuously dependent upon a signal at a control terminal, and means for applying to said control terminal a gradually varying signal.

2. The circuit card of claim 1, additionally including means for gradually decoupling said load from the system power supply voltage upon removal of the card.

3. The circuit card of claim 1, further including means for bypassing said gradually coupling means and directly connecting said load to said power supply voltage once said load is substantially completely coupled to said power supply voltage by said coupling means.

4. The circuit card of claim 3, further including means for deactivating the coupling function of said gradually coupling means after the load is directly connected to the power supply voltage.

5. The circuit card of claim 3 wherein said connector pins have various extensions so as to connect to said system at various times during insertion of said card, thereby to initiate sequential events in said gradual coupling and bypassing.

6. The circuit card of claim 4, wherein
said means for gradually coupling includes one connector pin connecting to said system at an early time during the insertion of the card, and
said means for deactivating includes another connector pin connecting to said system after said one pin, to apply to the control terminal a deactivating signal.

7. The circuit card of claim 1, wherein said means for coupling dependent upon a signal comprises a transistor having emitter, collector and base.

8. The circuit card of claim 7, wherein said output terminal is connected to the circuit load and includes the collector of said transistor, the input terminal is connectable through one of said pins to the power supply voltage and includes the emitter of said transistor.

9. The circuit card of claim 8, wherein said means for gradually coupling additionally includes a VMOS transistor having a drain connected to said transistor base and having a gate responsive to said signal.

10. The circuit card of claim 1, wherein said means for applying a gradually varying signal includes
a capacitance, and
means for changing the charge on the capacitance and deriving said signal from a voltage across the capacitance.

11. The circuit card of claim 10, further including means for gradually decoupling said load from the system power supply voltage upon removal of the circuit card, said decoupling means comprising means for discharging said capacitance upon removal of the card.

12. The circuit card of claim 4, wherein said means for gradually coupling includes:
a transistor for coupling the load to the power supply voltage through the transistor to an extent dependent upon a control signal,
a capacitance, and
means for charging said capacitance and deriving said control signal therefrom; and
wherein said means for deactivating includes means for discharging the capacitance.

13. The circuit card of claim 5 wherein
said means for gradually coupling includes one connector pin connecting to said system at an early time during insertion of the card, and
said means for bypassing includes another connector pin connecting to said system after said one pin, said another pin being directly electrically connected on the circuit card to said load.

14. In a circuit card of the type having a plurality of connector pins for electrically connecting to a system upon insertion of the card and disconnecting from the system upon removal of the card, and wherein the system includes a power supply voltage, and the circuit card includes an electrical circuit comprising a load for connection to the power supply voltage, the improvement comprising:
first, second, third and fourth connector pins having various extensions so as to connect to said system at various times during insertion of the card;
a transistor for coupling the load to the power supply voltage to an extent dependent on a control signal;
a capacitance;
means for charging said capacitance upon connection of said first pin during insertion of the circuit card;
means for utilizing a voltage across the capacitance as said control signal, thereby increasingly coupling the load to the power supply through said transistor during the charging of the capacitance;
bypassing means including said third pin for directly connecting the load to the power supply voltage after completion of said coupling by the transistor;
means including said fourth pin for interacting with said charging means upon the completion of said coupling by the transistor, to deactivate said coupling for the period between insertion and removal of the card, and for permitting said charging means to resume charging said capacitance upon the disconnection of said fourth pin during removal of the card thereby to recouple the load to the power supply voltage, said bypassing means including means for disconnecting the direct connection between said load and the power supply voltage when the resumption of charging of the capacitance has recoupled the load to the power supply voltage through the transistor; and
means responsive to the disconnection of said second pin during card removal for discharging said capacitor after said disconnection of the direct connection, thereby gradually decoupling the load from the power supply voltage through the transistor.

15. In a circuit card of the type having a plurality of connector pins for electrically connecting to a system upon insertion of the card and disconnecting from the system upon removal of the card, and wherein the system includes a power supply voltage and a reference voltage, and said card includes an electrical circuit which comprises a load for connection to the power supply voltage, the improvement comprising:
first, second, third and fourth connector pins having extensions such that, during insertion, the first pin connects first to said system, before said second pin connects next, said third pin connects third or at the same time as said second pin, and said fourth pin connects fourth, said pins disconnecting upon removal in the reverse order of their connections;
a resistance and capacitance network;
charging means for connecting said resistance and capacitance network to the power supply voltage through said first pin and thereby tending to charge said capacitance while said first pin is connected to the system;
a first transistor having the collector thereof connected to said load and the emitter connectable to the power supply voltage by means of said first pin;
active means, including a second transistor responsive to said capacitance, for driving the first transistor at the base thereof and thereby coupling said load to the power supply voltage through the first transistor, in proportion to the charge on said capacitance;

means for directly connecting said load to said third pin and thereby to said power supply voltage, the extension of said third pin with respect to said first pin being selected so that there is a sufficient interval between the connections of said first and third pins for said coupling of the load through the first transistor to become substantially complete;

means for connecting said resistance and capacitance network through said fourth pin to said reference voltage to discharge said capacitance during the period said fourth pin is connected, thereby terminating the coupling of said load to said power supply voltage through said first transistor and for disconnecting said network from the reference voltage when said fourth pin becomes disconnected upon removal of the circuit card, thereupon allowing said charging means to charge said capacitance and causing said coupling to resume, the extension of said fourth pin with respect to said third pin being selected so that the resumption of coupling of said load to the supply voltage through said first transistor is substantially complete by the time said third pin is disconnected during removal;

logic means for connecting said resistance and capacitance network to the system reference potential upon the disconnecting of the second pin during circuit card removal, and not connecting the network to the reference potential in the period before the connection of the second pin during card insertion, said logic means including means for changing state upon connection of the fourth pin during card insertion, said connecting to the reference potential by the logic means causing the capacitance to discharge and said active means to thereby gradually cease coupling the load to the power supply voltage through said first transistor, whereby upon insertion, the capacitance charges, the load is increasingly coupled to the power supply voltage through the first transistor, then the load is connected directly through the third pin to the power supply voltage, and the first transistor is turned off, and whereby upon removal, the capacitance charges, coupling the load to the power supply voltage through the first transistor, the direct connection between the supply voltage and the load is disconnected, and then the capacitance is discharged, progressively decoupling the load from the supply voltage through said first transistor, until the circuit card is completely removed.

16. In a circuit card of the type having a plurality of connector pins for electrically connecting to a system upon insertion of the card and disconnecting from the system upon removal of the card, and wherein the system includes a power supply voltage, and the circuit card includes an electrical circuit comprising a load for connection to the power supply voltage, the improvement comprising:

means for coupling the load to the power supply voltage to an extent which is substantially continuously dependent upon a signal at a control terminal;

means for initiating at said control terminal, upon insertion of said circuit card, a gradually varying signal selected to increasingly couple the load to the power supply voltage;

means for connecting said load directly to said power supply voltage, upon the substantial completion of said coupling by said coupling means;

means for then applying to the control terminal a signal for deactivating the coupling of the power supply voltage to the load through said coupling means;

means for reestablishing the coupling of the load to the power supply voltage through said coupling means, upon the beginning of the removal of the circuit card;

means for disrupting the direct connection of the load to the power supply voltage once said reestablishing of coupling has been substantially completed; and means for thereafter applying to said control terminal a gradually varying signal selected to decouple said load from said power supply voltage through said coupling means, as the circuit card is removed.

* * * * *